(No Model.)

H. KELLER.
BICYCLE CRATE.

No. 538,422. Patented Apr. 30, 1895.

WITNESSES.
F. Einfeldt
Bennett Dobbin

INVENTOR.
Henry Keller
By J. H. Sturgrove
Atty.

UNITED STATES PATENT OFFICE.

HENRY KELLER, OF ERIE, PENNSYLVANIA.

BICYCLE-CRATE.

SPECIFICATION forming part of Letters Patent No. 538,422, dated April 30, 1895.

Application filed February 8, 1895. Serial No. 537,699. (No model.)

*To all whom it may concern:*

Be it known that I, HENRY KELLER, a citizen of the United States, residing at the city of Erie, in the county of Erie and State of Pennsylvania, have invented certain new and useful Improvements in Bicycle-Crates; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in bicycle crates, hereinafter set forth and explained and illustrated in the accompanying drawings, in which—

Figure 1:
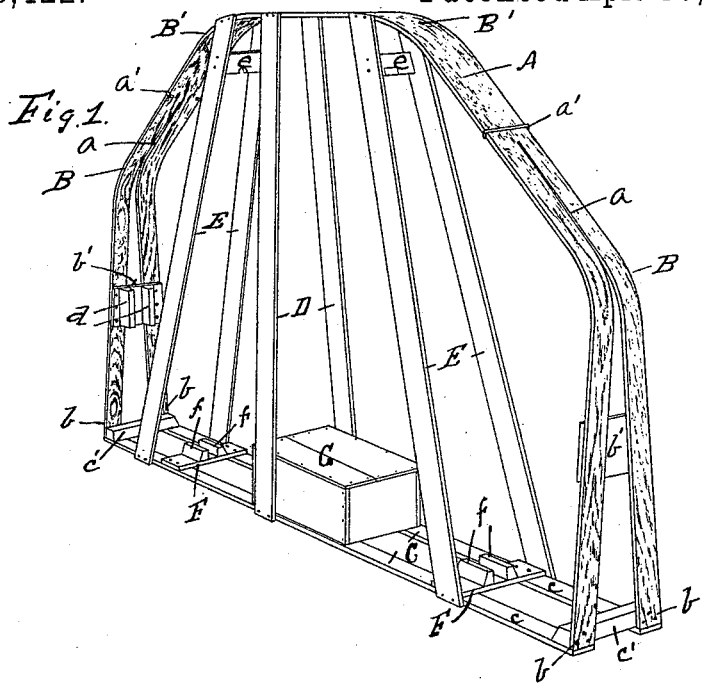
Figure 2:
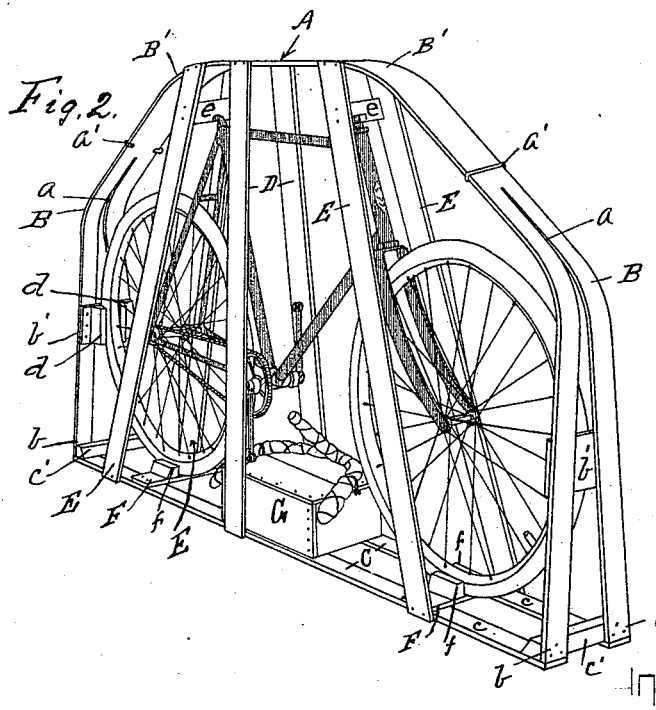

Figure 1 is a perspective view of my improved bicycle-crate. Fig. 2 is a like view of the same with a bicycle in it.

Heretofore bicycle crates have ordinarily been made by cutting lumber into suitable lengths and nailing these lengths together into such shape as to inclose the bicycle to be crated. In order to make such a crate of sufficient strength as to stand shipment, lumber of considerable thickness must be used to make the crate rigid and strong. The result of this construction is that the crate is very heavy, weighing nearly as much, and in many cases more than the bicycle it incloses, and thus materially adding to the cost of shipment and freight therefor. Again, the amount of lumber used in bicycle crates, as ordinarily constructed, and the large number of nails necessarily used in such crates, materially add to the expense of their construction, over and above what a bicycle crate should cost. To overcome these difficulties I have devised a bicycle crate which I am enabled to construct of thin lumber and which has comparatively few joints, and I thereby am enabled to construct them at very much less cost, and so as to weigh but little over one-half as much as bicycle crates as usually constructed.

In the accompanying drawings illustrating my improved bicycle crate, A is a strip of thin lumber, split or sawed apart longitudinally at $a\,a$ for about one-third of its length, from each end toward its center. At the ends of these splits or saw kerfs $a\,a$, I place clamps $a'\,a'$. The band A is then bent over a form, so as to produce bends B B and B' B' therein. The lower ends $b\,b$ are then spread apart and cross pieces $b'$ are nailed thereto, which secure the ends $b\,b$ the proper distance apart to be secured to the bottom or base C of the crate. This bottom or base C is preferably made of two narrow strips $c\,c$, to the ends of which blocks $c'\,c'$ are nailed, and to these blocks $c'\,c'$ the ends $b\,b$ of the bent portion A of the crate are securely nailed. I then nail upright braces D D to the central portion of each side of the bottom C and of the bent top A, and diagonal braces E E to each side of the bottom C and of the bent top A at such an angle as to approximately cover the upright portions of the frame of the bicycle. Across the bottom C I also nail cross pieces F F, to which blocks $f\,f$ are nailed, between which the tires of the bicycle wheels rest when in the crate. Blocks $d\,d$ are also nailed to the cross pieces $b'\,b'$ so that the tires of the wheels are supported between them, and between the upper ends of the braces E E transverse notched blocks $e\,e$ are secured, adapted to engage the tops of the upright parts of the bicycle frame, so that the bicycle is firmly secured between the blocks $f\,f$, $d\,d$ and $e\,e$ when in place in the crate.

To the bottom C between the lower ends of the vertical central braces D D I secure a box G adapted to hold the pedals, saddle and other removable parts of the bicycle crated.

Having thus fully described my invention, so as to enable others to construct and use the same, what I claim as new, and desire to secure by Letters Patent of the United States, is—

1. The combination in a bicycle crate, of a bent upper section constructed of a single piece, with a horizontal base section secured at its ends to the ends of the bent section, blocks secured to the bent portion and base between which the wheels of the bicycle rest, and side braces extending from the base to the bent portion of the crate, substantially as and for the purpose set forth.

2. The combination in a bicycle crate, of a bent upper section, having its ends split and spread apart, cross pieces and blocks for engaging the sides of a bicycle wheel on said bent section, a horizontal base secured to the ends of the bent section, and blocks thereon, between which the bicycle wheels rest, side braces extending from the base to the bent portion of the crate, cross pieces between the braces for engaging the upper part of the bicycle frame, and a box secured to the base of the frame, substantially as and for the purpose set forth.

In testimony whereof I affix my signature in presence of two witnesses.

HENRY KELLER.

Witnesses:
FRED EINFELDT,
C. B. HAYES.